US010375623B2

(12) United States Patent
Bajko et al.

(10) Patent No.: US 10,375,623 B2
(45) Date of Patent: Aug. 6, 2019

(54) METHOD OF JOINING CO-LOCATED BSS

(71) Applicant: MediaTek Singapore Pte. Ltd., Singapore (SG)

(72) Inventors: Gabor Bajko, Santa Clara, CA (US); Chao-Chun Wang, Taipei (TW); Chih-Shi Yee, Hsinchu County (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 14 days.

(21) Appl. No.: 15/313,953

(22) PCT Filed: May 27, 2015

(86) PCT No.: PCT/SG2015/050128
§ 371 (c)(1),
(2) Date: Nov. 24, 2016

(87) PCT Pub. No.: WO2015/183199
PCT Pub. Date: Dec. 3, 2015

(65) Prior Publication Data
US 2017/0195943 A1    Jul. 6, 2017

Related U.S. Application Data

(60) Provisional application No. 62/003,238, filed on May 27, 2014.

(51) Int. Cl.
*H04W 64/00* (2009.01)
*H04W 48/08* (2009.01)
*H04W 84/12* (2009.01)
*H04W 56/00* (2009.01)

(52) U.S. Cl.
CPC ........... *H04W 48/08* (2013.01); *H04W 84/12* (2013.01); *H04W 56/00* (2013.01)

(58) Field of Classification Search
None
See application file for complete search history.

(56) References Cited

U.S. PATENT DOCUMENTS 9,661,560 B2 *   5/2017   Park ..................... H04W 48/16
2007/0081477 A1  4/2007   Jakkahalli
2008/0144591 A1  6/2008   Jokela
(Continued)

FOREIGN PATENT DOCUMENTS

WO   2014027838 A1   2/2014
WO   2014045004 A1   3/2014

OTHER PUBLICATIONS

"International Search Report" dated Sep. 11, 2015 for International application No. PCT/SG2015/050128, International filing date May 27, 2015.
(Continued)

*Primary Examiner* — Eunsook Choi
(74) *Attorney, Agent, or Firm* — Winston Hsu

(57) ABSTRACT

A method for a multiple BSSID environment in a wireless location area network (WLAN) is proposed. A first wireless device obtains basic service set (BSS)information of a plurality of BSSs. The first wireless device then sends a fine time measurement (FTM) frame containing the BSS information to a second wireless device. The second wireless device joins at least one of the BSS according to the BSS information.

4 Claims, 2 Drawing Sheets

(56) References Cited

U.S. PATENT DOCUMENTS

| | | | | |
|---|---|---|---|---|
| 2008/0253302 A1* | 10/2008 | Nago | .................... | H04W 8/005 |
| | | | | 370/254 |
| 2009/0103501 A1* | 4/2009 | Farrag | ................... | H04W 74/02 |
| | | | | 370/337 |
| 2012/0229334 A1 | 9/2012 | Waters | | |
| 2014/0120947 A1 | 5/2014 | Siomina | | |
| 2014/0293869 A1* | 10/2014 | Jeffery | .............. | H04W 74/0808 |
| | | | | 370/328 |
| 2015/0264530 A1* | 9/2015 | Prechner | ............... | H04W 4/025 |
| | | | | 455/456.2 |
| 2015/0319631 A1* | 11/2015 | Aldana | ................. | H04W 64/00 |
| | | | | 370/252 |
| 2016/0029178 A1* | 1/2016 | Schatzberg | ........... | H04W 64/00 |
| | | | | 455/456.1 |
| 2016/0255603 A1* | 9/2016 | Venkatraman | ......... | G01R 29/10 |
| | | | | 455/456.1 |

OTHER PUBLICATIONS

Brian Hart et al, IEEE P802.11 Wireless LANs, Mar. 18, 2014, pp. 1-27, doc.: IEEE 802.11-13/1509r6, XP068068824.

* cited by examiner

METHOD OF JOINING CO-LOCATED BSS

CROSS REFERENCE TO RELATED APPLICATIONS

This application claims priority under 35 U.S.C. § 119 from U.S. Provisional Application No. 62/003,238 entitled "FTM and co-located BSSs," filed on May 27, 2014, the subject matter of which is incorporated herein by reference.

TECHNICAL FIELD

The disclosed embodiments relate generally to local wireless area network (WLAN) communications, and, more particularly, to direct finding and positioning in wireless local area networks (WLANs).

BACKGROUND

IEEE 802.11 is a set of media access control (MAC) and physical layer (PHY) specification for implementing wireless local area network (WLAN) communication, in the unlicensed (2.4, 5, and 60 GHz) frequency bands. The standards and amendments provide the basis for wireless network products using the IEEE 802.11 frequency bands. IEEE 802.11 plays an important role in the growing application of Indoor/Outdoor Location. The key applicable technology is that of ranging using time-of-flight (TOF) ranging measurements defined in IEEE 802.11v. Once the distance between devices is measured, the information can be used to determine device location.

In IEEE 802.11-REVmc, Fine Timing Measurement (FTM) protocol is proposed for Indoor Location. Based on FTM, an initiating station exchanges FTM frames during an FTM session with a responding station to measure the time-of-flight(TOF) or the Round Trip Delay (RTD/2). The initiating station then computes its range to the responding station after receiving timing measurements (i.e., timestamps corresponding to the departure time and arrival time of the FTM frames) from the responding station. To calculate a station position, the station performs ranging measurements with multiple access points (APs) via FTM frame exchange and obtains AP's positions. FTM positioning requires the initiating station to exchange FTM frames with multiple responding APs for TOF measurements in order to determine its absolute location. For 3D positioning, the station needs to exchange FTM frames with four or more APs in order to determine its absolute location.

However, for managed/controlled environments like airports, enterprise, or department stores, it is common to have many Basic Service Sets (BSSs) or Service Set Identifiers (SSIDs) at close locations, i.e. co-located, as shown in FIG. 1. Therefore, it is no benefit for a station (STA) to initiate FTMs with co-located BSSs, because the STA will get the same location and round trip time (RTT). The APs might as well get overloaded with the FTMs. Ideally, STAs would identify co-located BSSs and avoid doing FTM with co-located BSSs. The STA should consider whether co-located BSSs of different capability can provide different level of location information, such as security, accuracy, etc, and whether there are more than one set of location information with respect to the same AP with different accuracy through different BSSs.

One of the conventional method is using multiple BSSID (mBSSID) to signal in beacons which BSSIDs are co-located. The MAC addresses for the co-located BSSs have to be contiguous, otherwise the feature cannot be used. However, the co-located BSSs may be administered by different entities, thus it is not possible to perform coordination between the co-located BSSs.

Another known method is when multiple BSSs are co-located, only one of the BSSs can advertise FTM capability. But this method requires co-ordination between the BSSs. If a STA is associated with one of the BSSs which does not advertise FTM support, it may need to go off the channel to do FTM with the BSS that indicates the support for it. Besides, this method does not allow the BSSs to provide FTM with different resolutions, add-on features, etc. Moreover, if the BSSs belong to different operators, it would be hard to agree which one to advertise FTM support.

Hence, there's a need for a solution for simplified FTM advertising.

SUMMARY

It is therefore a object of the present invention to provide a method for a multiple BSSID environment. In this method, a first wireless device obtains basic service set (BSS) information of a plurality of BSSs. The first wireless device then sends a fine time measurement (FTM) frame containing the BSS information to a second wireless device.

In one embodiment, the BSS information is co-located BSS information.

In another embodiment, the FTM frame is an unicast frame.

In yet another embodiment, the second wireless device wirelessly joins to one of the plurality of BSS according to the BSS information.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
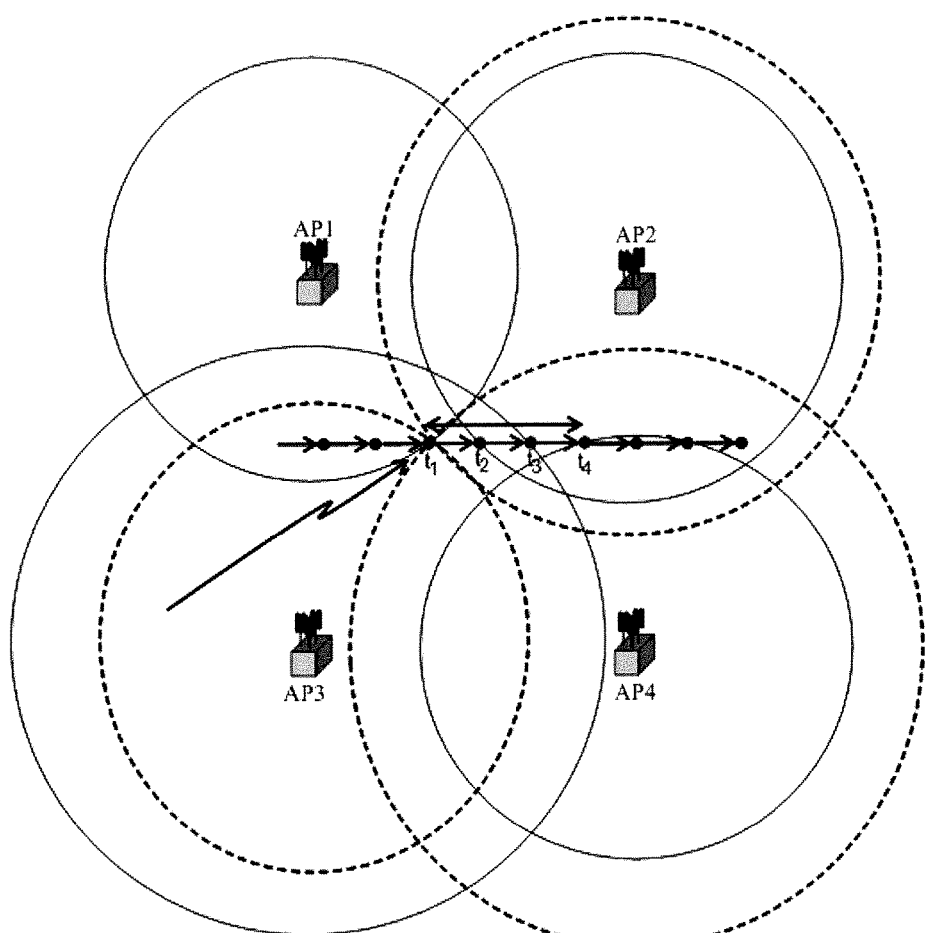
FIG. 1 illustrates the geometry of AP positions.
Figure 2:
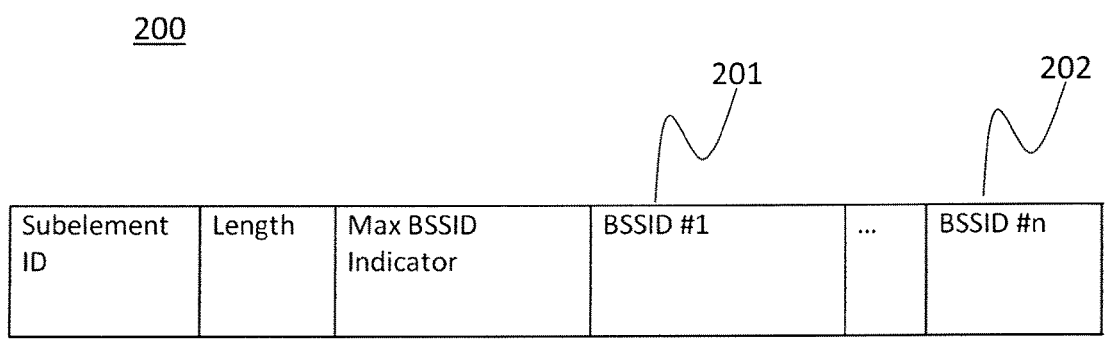
FIG. 2 illustrates a frame in accordance with one novel aspect.

According to an embodiment of the present invention, the co-located BSSs can advertise freely and independently about the FTM support that each BSS has. Therefore, a first wireless device such as the access points (APs) in each of the BSS, can receive the co-located BSS information. The AP can then send FTM frames that includes mBBSID or MAC addresses of the co-located BSSs, such as the frame shown in FIG. 2. The FTM frame 200 includes the BSSID 201 of co-located BSS#1 until the BSSID 202 of co-located BSS#n.

Compared to sending mBSSID in beacon that used in prior arts, the present embodiment does not overload the beacon, and the FTM frame can indicate a list of BSSIDs as it is unicast. Therefore, when a second wireless device, such as a station (STA), receives the FTM frame that contains the mBBSID or MAC addresses of the co-located BSSs, the STA can select one of the BSSs to join and to perform FTM function.

In another example, the FTM frame can contain multiple mBSSID elements instead of a list of BSSIDs. This embodiment does not require coordination between the co-located BSSs. It only needs the MAC addresses information of co-located BSSs. And the BSSs can learn this information from each other.

According to another embodiment of the present invention, an indication can be added to the beacon to show that this BSS is co-located with other BSSs. The indication may be only one bit in size. In other words, the beacon provides the capability for a STA to obtain the list of co-located BSSs' MAC addresses when the STA receives such beacons from different BSSs. According to an embodiment of the present invention, a new Access Network Query Protocol (ANQP) element can be defined to ask the BSS about the MAC addresses of the co-located BSSs. Therefore, the STA can do FTM with only one BSSID from the list received. Similarly, this embodiment does not require coordination between the co-located BSSs. It only needs the MAC addresses information of co-located BSSs. And this information can be learned or shared from each other.

According to yet another embodiment of the present invention, an indication can be added to the beacon to show that this BSS is co-located with other BSSs. The indication may be only one bit in size. In other words, the beacon provides the capability for a STA to obtain the list of co-located BSSs' MAC addresses when the STA receives such beacons from different BSSs. According to an embodiment of the present invention, the STA can send a FTM Request Frame including one bit that is used to request the list of BBSIDs of the co-located BSSs. So an AP provides a FTM Frame to contain the list of co-located BSSIDs when requested in the FTM Request Frame.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   obtaining by a first wireless device being an access point (AP) a plurality of basis service set identifiers (BSSID) respectively corresponding to a plurality of BSS being at least two BBS, wherein every BSS can advertise freely;
   sending by the first wireless device a fine time measurement (FTM) frame containing the plurality of BSSID to a second wireless device being a station (STA); and
   the second wireless device determining to join at least one of the plurality of BSS according to the BSSID in the FTM frame.

2. The method of claim 1, wherein the plurality of BSS are co-located BSS.

3. The method of claim 1, wherein the FTM frame is a unicast frame.

4. The method of claim 1, wherein the BSSID comprises MAC addresses of a plurality of co-located BSS.

\* \* \* \* \*